United States Patent Office 2,778,836
Patented Jan. 22, 1957

2,778,836

SUBSTITUTED 2-METHYL-Δ² IMIDAZOLINES

Henri Morren, Forest-Brussels, Belgium, assignor to Union Chimique Belge, S. A., Brussels, Belgium, a corporation of Belgium No Drawing. Application February 3, 1955,
Serial No. 486,015

Claims priority, application Belgium April 2, 1954

4 Claims. (Cl. 260—309.6)

The present invention relates to a process for the preparation of imidazolines having peculiar vasoconstrictive properties.

It is known that some derivatives of imidazoline are both vasoconstrictors and hypertensors.

However, other derivatives, such as 2-benzyl-Δ²-imidazoline and 2-(p-methoxybenzyl)-Δ²-imidazoline, are hypotensors which reverse the tensional effects of adrenalin.

It was desirable to discover vasoconstrictive substances tending to exhibit a progressively more local action that is to say, substances which, like the sympathomimetic substances, would have a powerful constrictive action on the arterioles and the capillaries, but which would only have a lowest hypertensive activity on the vascular system.

Products prepared in accordance with the present invention have these features, namely a powerful local vasoconstrictive action and very reduced general activity. In other words, these products according to the present invention have a definitely higher peripheral activity than the known hypertensive imidazolines.

What is called the index of peripheral activity corresponds to the value of the proportion between the vasoconstrictive action and the general tensional action.

Biological tests have shown that the values of R=index of peripheral activity are:

2 - (1-naphthylmethyl)-Δ²-imidazoline (known substance) _____ R=1.
2-(5,6,7,8-tetrahydro - 1 - naphthylmethyl)-Δ²-imidazoline _____ R=4.
2 - (p-phenoxybenzyl)-Δ²-imidazoline_____ R=8.
2-(5,6,7,8-tetrahydro - 2 - naphthylmethyl)-Δ²-imidazoline _____ R=0.88.

The last example is quoted to show that the new features in the activity of some derivatives of imidazoline could absolutely not be foreseen.

New derivatives, the preparation of which forms the subject of the present invention, were obtained by reaction under heat of ethylenediamine with aromatic acids or with derivatives of these acids, such as the amides, the esters and the nitriles. These are: 2-(5,6,7,8-tetrahydro-1-naphthylmethyl)-Δ²-imidazoline, 2-(5,6,7,8-tetrahydro-2-naphthylmethyl)-Δ²-imidazoline, 2-(p-phenoxybenzyl)-Δ²-imidazoline, as also the salts thereof.

Example 1

A mixture of 1 mole of 5,6,7,8-tetrahydro-1-naphthylacetic acid, 1.1 moles of ethylenediamine monohydrate and 1.1 moles of hydrochloric acid in concentrated solution is mechanically agitated and progressively heated to about 260° C. The mixture is maintained at this temperature for 5 hours. The water formed in the course of the cyclisation escapes by distillation.

When the reaction has ended, the mixture is cooled and treated with a 20% sodium hydroxide solution, whereafter it is extracted by means of benzene. The imidazoline derivative formed is separated from the starting products in the form of its hydrochloride by extracting the benzenic solution by means of normal hydrochloric acid. The aqueous acid solution is evaporated under vacuum. The residue, which is the hydrochloride of imidazoline, is treated with a sodium hydroxide solution. The base is extracted by means of benzene and dried over calcined potassium carbonate, the solvent is driven off and the base is distilled under vacuum. 2-(5,6,7,8-tetrahydro-1-naphthylmethyl)-Δ²-imidazoline is obtained, the boiling point of which is 170–172° C./0.01 mm. Hg.

From the corresponding acids, 2-(5,6,7,8-tetrahydro-2-naphthylmethyl)-Δ²-imidazoline (boiling point: 173–174° C./0.04 mm. Hg) and 2-(p-phenoxybenzyl)-Δ²-imidazoline (boiling point: 197–200° C./0.01 mm. Hg) are similarly prepared.

Example 2

A mixture of 1 mole of 5,6,7,8-tetrahydro-1-naphthylacetic acid and 2.5 moles of ethylenediamine monohydrate is mechanically agitated and heated at about 250° C. for about 6 hours. The mixture obtained contains 2-(5,6,7,8-tetrahydro-1-naphthylmethyl)-Δ²-imidazoline, which is separated as in Example 1. The other two products indicated in Example 1 may also be prepared in the same manner.

Example 3

A mixture of 1 mole at 5,6,7,8-tetrahydro-1-naphthylacetamide and 1 mole of ethylenediamine dihydrochloride is agitated and heated at about 250° C. The heating is continued for about two hours. The imidazoline produced is separated by the same method as in Example 1.

Example 4

1 mole of 5,6,7,8-tetrahydronaphthyl-1-naphthylacetonitrile and 1 mole of absolute ethanol are dissolved in 500 ml. of petroleum ether. While the mixture is vigorously agitated and the temperature is maintained at 0° C., a current of dry gaseous hydrochloric acid is introduced until saturation.

The hydrochloride of the iminoester thus formed takes the form of an oil which is decanted and washed a number of times with dry ether. Finally, the iminoester is dissolved in 250 ml. of absolute ethanol. 1 mole of anhydrous ethylene-diamine is then added and the mixture is heated on the water-bath for two hours.

After the reaction, the alcohol is driven off and the imidazoline is isolated by the method described in Example 1.

Example 5

A mixture of 1 mole of 5,6,7,8-tetrahydronaphthyl-1-naphthylacetonitrile, 1 mole of anhydrous ethylenediamine, 4 ml. of carbon disulphide and 500 cc. of absolute ethanol saturated with hydrogen sulfide is heated in an autoclave at about 100° C. for 12 hours.

After the reaction, the alcohol is driven off and the imidazoline is isolated as described in Example 1.

I claim:

1. A compound selected from those represented by the formula

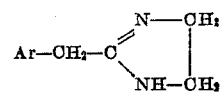

wherein Ar is an aromatic radical selected from the group consisting of 5,6,7,8-tetrahydro-1-naphthyl, 5,6,7,8-tetrahydro-2-naphthyl and p-phenoxyphenyl radicals.

2. The compound 2-(5,6,7,8-tetrahydro-1-naphthylmethyl)-Δ²-imidazoline.

3. The compound 2-(5,6,7,8-tetrahydro-2-naphthylmethyl)-Δ²-imidazoline.

4. The compound 2-(p-phenoxybenzyl)-Δ²-imidazoline.

References Cited in the file of this patent

UNITED STATES PATENTS 2,411,867    Carlsson _____ May 18, 1948

FOREIGN PATENTS 620,339    Great Britain _____ Dec. 12, 1947

OTHER REFERENCES

Cavallini: Chem. Abst., vol. 41, p. 6989 (1947).